D. RONCONI.
TOY.
APPLICATION FILED OCT. 18, 1913.
1,113,051.
Patented Oct. 6, 1914.
2 SHEETS—SHEET 1.
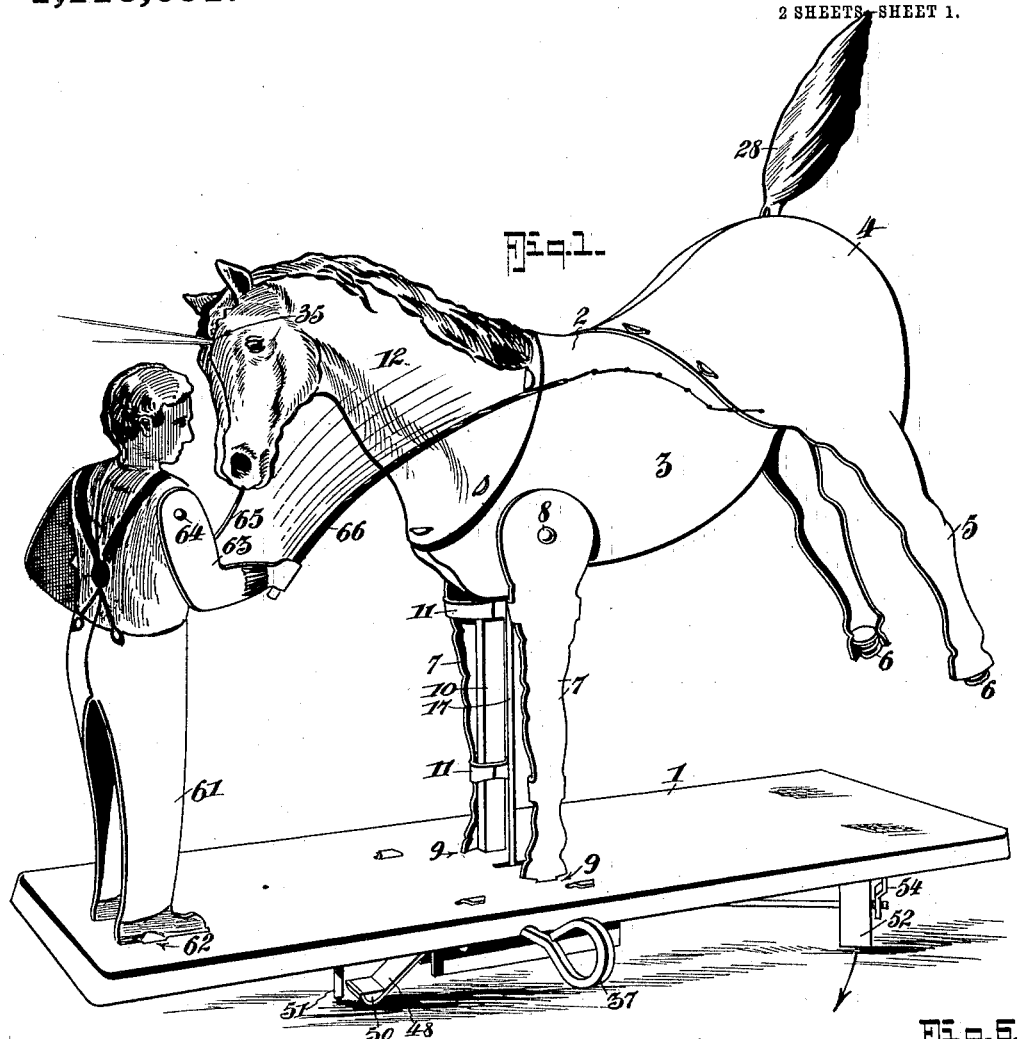

D. RONCONI.
TOY.
APPLICATION FILED OCT. 18, 1913.
1,113,051.
Patented Oct. 6, 1914.
2 SHEETS—SHEET 2.
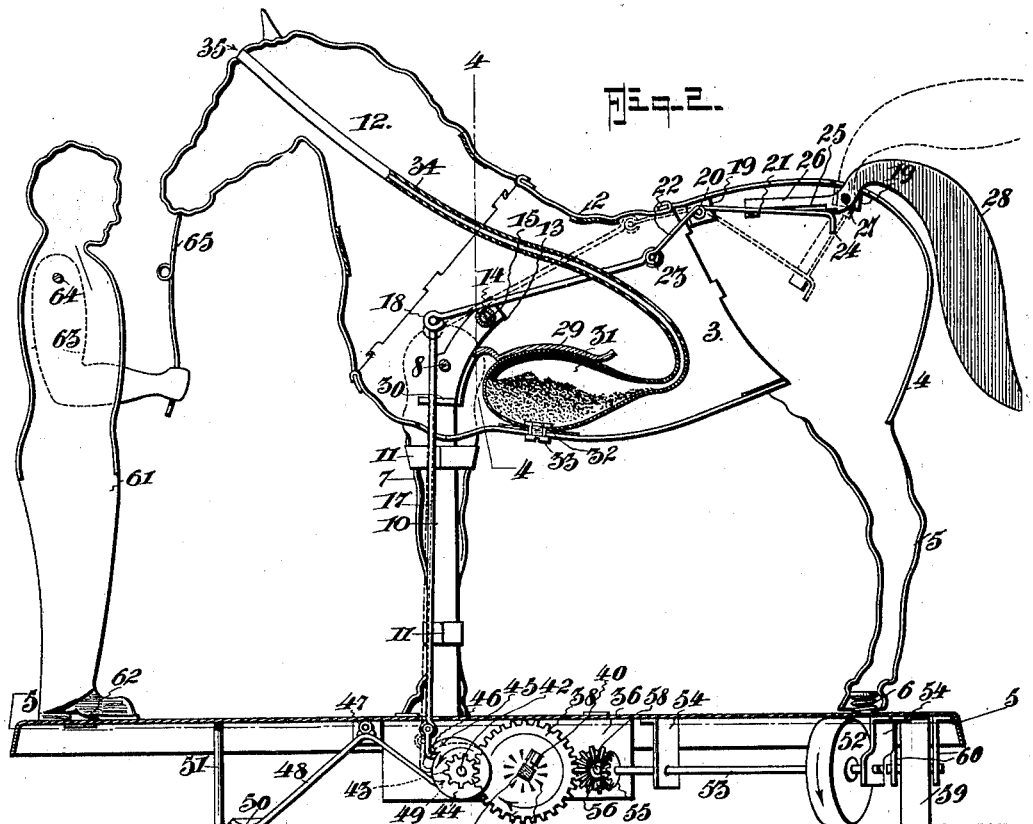
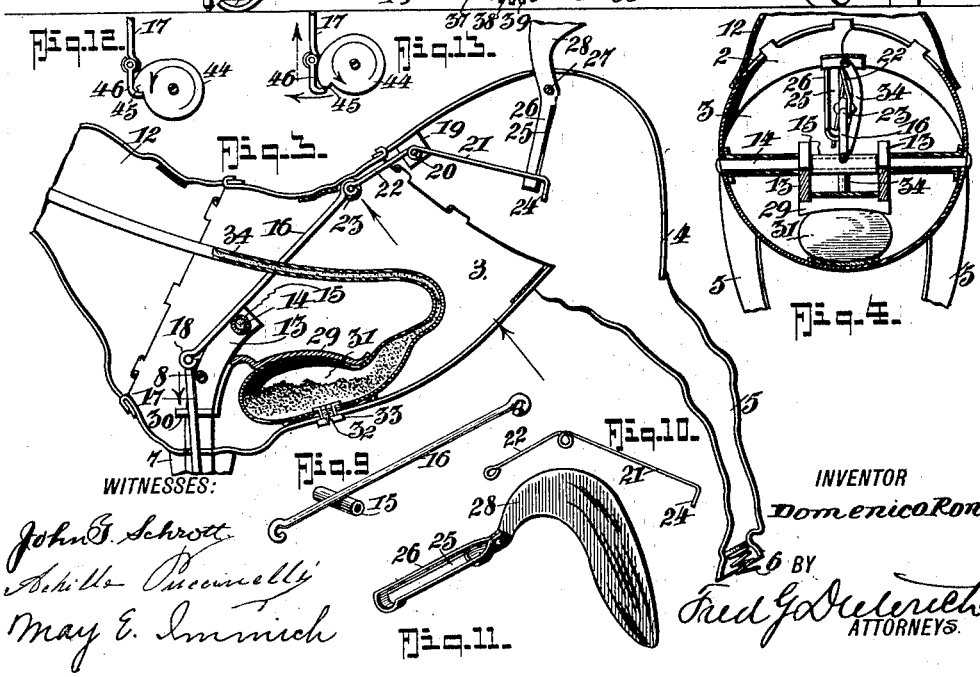
WITNESSES:
INVENTOR
Domenico Ronconi
BY
ATTORNEYS

UNITED STATES PATENT OFFICE.

DOMENICO RONCONI, OF CHICAGO, ILLINOIS.

TOY.

1,113,051. Specification of Letters Patent. Patented Oct. 6, 1914.

Application filed October 18, 1913. Serial No. 795,960.

*To all whom it may concern:*

Be it known that I, DOMENICO RONCONI, residing at Chicago, in the county of Cook and State of Illinois, have invented a new and Improved Toy, of which the following is a specification.

My invention relates to the art of mechanical toys of the type designed to represent animals and other figures.

Generically, the invention has for its object to provide a toy representing a spirited horse being held by an attendant, the horse and the attendant being mounted on a platform or movable base, mechanism being provided whereby as the base turns or moves around, the animal will rear up on its fore-legs in a manner to simulate the action of a spirited horse, the attendant, at the same time as the animal rears up, being designed to operate to bring a whip down upon the horse.

In carrying out the invention, means are provided for first raising the tail of the animal and then upon further action of the said means, to elevate the rear end of the animal on its fore-legs, as pivots, this action also serving to move the attendant's arm to bring the whip down on the animal.

Supplementing the foregoing, the invention also includes a means for ejecting perfume or other substance during the movements of the animal.

More subordinately, the invention includes those novel details of construction, combination and arrangement of parts, all of which will be first fully described, and then be specifically pointed out in the appended claims, reference being had to the accompanying drawings, in which:—

Figure 1 is a perspective view illustrating the toy. Fig. 2 is a vertical longitudinal section of the same, the horse being in the position of repose in full lines and showing the position of the tail during the first part of the action of the raising mechanism in dotted lines. Fig. 3 is a detail view similar to Fig. 2, showing the position of the parts at the completion of the action of the raising mechanism. Fig. 4 is a cross section on the line 4—4 of Fig. 2. Fig. 5 is a horizontal section on the line 5—5 on Fig. 2. Fig. 6 is a detail perspective view of the master gear and ratchet. Fig. 7 is a detail perspective view of a brake device. Fig. 8 is a detail perspective view of the bulb squeezer. Fig. 9 is a detail perspective view of the main elevating lever. Fig. 10 is a detail perspective view of the supplemental tail elevating lever. Fig. 11 is a detail perspective view of the tail. Figs. 12 and 13 are detail views illustrating the action of the cam.

Upon a suitable base 1 are mounted the figures, which constitute the principal parts of the toy. The figure which represents a horse includes the back 2, the body 3, the rump 4 with the hind legs 5, and the fore-legs 7. The hind legs 5 are provided with buffer springs 6 to act as shock absorbers on the "drop" of the animal. The legs 7 carry the pivot 8 on which the body 3 is pivoted and the legs 7 are secured at 9 to the base 1, in any suitable manner.

10 is the main supporting frame to which the legs 7 are fastened as at 11, by ears which project from the legs 7 and bend around the supports 10.

12 designates the head of the animal.

The main supports or standards 10 project up into the body 3 of the animal, and form bearings for the pivot 8, the supports 10 curving upwardly and rearwardly at 13 to support the pivot 14 on which the main elevating lever 16 is secured, the lever 16 having a bearing sleeve 15, as best shown in Fig. 9.

17 is the main operating rod which is pivoted at 18 to the short end of the lever 16, and the rod 17 projects down between the fore-legs 7, and through a slot in the base 1 to carry a hook 46 that coöperates with the finger 45 of the cam 44 later again referred to. Within the body 3 and adjacent to the back 2 are ears 19 which carry pivot 20 on which the tail operating supplemental lever is fulcrumed, the short arm 22 of this lever being pivoted at 23 to the long arm of the main elevating lever 16, while the long arm 21 of the tail operating lever projects through the slot 25 in the lever end 26 of the tail, and has a portion 24 bent over to prevent disconnection. The tail 28 is pivoted at 27.

29 is the squeezer which is rigidly secured at 30 to the supports 10 and is adapted to squeeze the bulb 31 that is secured at 32 within the body of the animal to eject the contents of the bulb upon the raising up or rearing up of the horse. The bulb 31 which may contain perfumery, powder or any other suitable substance has an outlet pipe 34 which may discharge at any place desired through a suitably located vent 35.

36 is the power motor which is of the spring type and is mounted beneath the base 1.

37 is the winding up key of the motor which has a ratchet and pawl connection 40—39 with the master gear 38 to which the driving spring 41 is connected. The master gear 38 meshes with a pinion 43 on the cam shaft 42 so as to drive the cam 44, and the master gear 48 also meshes with a gear 57 on a shaft 58 that is connected by bevel gears 56—55 to drive the shaft 53, the shaft 53 being mounted in bearings 54 and carrying the driving wheel 52 that turns the support or base 1 around the pin 51 as a center.

59 is a supporting wheel that is mounted in bearing brackets 60 beneath the platform 1 to coöperate with the wheel 52 and the pin 51 to support the superstructure.

48 is a brake lever that is pivoted at 47, and has a flattened end 49 that is adapted to engage the teeth of the gear 43 when the base 1 is raised up sufficiently to permit the weight 50 to drop below the plane of the bottom of the pin 51 and wheels 52—59.

61 is the representation of an attendant and this representation is secured at 62 to the base 1 and is provided with arms 63 which are fastened to a shaft 64 that projects through the body of the figure and forms a pivot, one of the arms being connected with the horse's head through the connecting "bridle" 65, while the end of the other arm grasps the whip 66. The whip arm is operated through the shaft 64, and arm that is secured to the bridle 65, which bridle is in the nature of a relatively rigid member.

In action, the base 1 is put upon a table or other support after the motor has been wound up, and as soon as this is done, the brake lever 48 will be rocked to release the motor which then moves the base 1 around in a circle with the pin 51 as the center. As this occurs the cam 44 will draw down on the rod 17. During the first part of the movement of the rod 17 the lever 16 will be rocked to regulate the tail elevating lever 21—22 and elevate the tail, this action occurring while the tail is moving from the full line position to the dotted line position in Fig. 2. A further movement of the rod 17 downwardly through the action of the cam 44 will elevate the animal to the position shown in Figs. 1 and 3, by reason of the fact that the end of the lever 16 that carries the pivot 23 engages the back 2 and presses the same upwardly, the body being hinged at 8 will, accordingly rise to the position shown in Figs. 1 and 3. As this occurs the bulb 31 will be squeezed by being pressed up against the squeezer 29 and a part of the contents of the same will be ejected.

33 is a filling opening closed by a plug through which the bulb 31 may be recharged.

While I prefer to employ the toy in its complete aspect as illustrated, yet I desire it understood that the bulb 31 and the parts directly coöperating therewith may be omitted, and I also desire it understood that the vent 35 may be located at any place desired.

From the foregoing description taken in connection with the accompanying drawings, it is believed the complete construction and operation of the toy will be readily apparent to those skilled in the art to which it appertains.

What I claim is:

1. In a toy, a base, an "animal" figure mounted on the base and including rigid fore-legs, hind legs and a body pivoted to said fore-legs, a tail pivoted to the body, and means for first elevating the tail and then upon further movement move the body on its pivot to raise the rump of the "animal", the restoration of the aforesaid parts to their normal position being effected by gravity, and a clock works motor mechanism including traction wheels for moving the base and operating said elevating means.

2. In a toy, a base, an "animal" figure mounted on the base and including rigid fore-legs, hind legs and a body pivoted to said fore-legs, a tail pivoted to the body, an intermittently operating means for first elevating the tail and then upon further movement move the body on its pivot to raise the rump of the "animal", the restoration of the aforesaid parts to their normal position being effected by gravity.

3. In a toy, a base, an "animal" figure mounted on the base and including rigid fore-legs, hind legs and a body pivoted to said fore-legs, a tail pivoted to the body, and means for first elevating the tail and then upon further movement move the body on its pivot to raise the rump of the "animal", the restoration of the aforesaid parts to their normal position being effected by gravity, a pivot on which said base is mounted, and means for turning said base on its pivot during the movements of the "animal".

4. In a toy, a base, an "animal" figure mounted on the base and including rigid fore-legs, hind legs and a body pivoted to said fore-legs, a tail pivoted to the body, and intermittently operating means for first elevating the tail and then upon further movement move the body on its pivot to raise the rump of the "animal", a pivot on which said base is mounted, and means for turning said base on its pivot during the movements of the "animal".

5. In a toy, a base, an "animal" figure mounted on the base and including rigid fore-legs, hind legs and a body pivoted to said fore-legs, a tail pivoted to the body, and means for first elevating the tail and then upon further movement move the body on its pivot to raise the rump of the "animal," the restoration of the aforesaid parts to their normal position being effected by gravity, a human figure form mounted on said base and including arms hinged to the body of the form to operate in unison, a connection between one of said arms and the animal figure, and a whip grasped by the hand of the other arm for engaging the "animal" body when said body is raised.

6. In a toy, a base, an "animal" figure mounted on the base and including rigid fore-legs, hind legs and a body pivoted to said fore-legs, a tail pivoted to the body, and intermittently operating means for first elevating the tail and then upon further movement move the body on its pivot to raise the rump of the "animal," the restoration of the aforesaid parts to their normal position being effected by gravity, a human figure form mounted on said base and including arms hinged to the body of the form to operate in unison, a connection between one of said arms and the animal figure, and a whip grasped by the hand of the other arm for engaging the "animal" body when said body is raised.

7. In a toy, a base, an "animal" figure mounted on the base and including rigid fore-legs, hind legs and a body pivoted to said fore-legs, a tail pivoted to the body, and means for first elevating the tail and then upon further movement move the body on its pivot to raise the rump of the "animal," the restoration of the aforesaid parts to their normal position being effected by gravity, a pivot on which said base is mounted, means for turning said base on its pivot during the movements of the "animal," a human figure form mounted on said base and including arms hinged to the body of the form to operate in unison, a connection between one of said arms and the animal figure, and a whip grasped by the hand of the other arm for engaging the "animal" body when said body is raised.

8. In a toy, a base, an "animal" figure mounted on the base and including rigid fore-legs, hind legs and a body pivoted to said fore-legs, a tail pivoted to the body, and intermittently operating means for first elevating the tail and then upon further movement move the body on its pivot to raise the rump of the "animal," the restoration of the aforesaid parts to their normal position being effected by gravity, a pivot on which said base is mounted, means for turning said base on its pivot during the movement of the "animal," a human figure form mounted on said base and including arms hinged to the body of the form to operate in unison, a connection between one of the arms and the animal figure, and a whip grasped by the hand of the other arm for engaging the "animal" body when said body is raised.

9. In a toy, a base, an "animal" figure mounted on the base and including rigid fore-legs, hind legs and a body pivoted to said fore-legs, a tail pivoted to the body, and means for first elevating the tail and then upon further movement move the body on its pivot to raise the rump of the "animal," the restoration of the aforesaid parts to their normal position being effected by gravity, a reservoir within the "animal" figure, and means for coöperating with said reservoir upon the raising of the "animal" body for ejecting the contents of the reservoir.

10. In a toy, a base, an "animal" figure mounted on the base and including rigid fore-legs, hind legs and a body pivoted to said fore-legs, a tail pivoted to the body, and intermittently operating means for first elevating the tail and then upon further movement move the body on its pivot to raise the rump of the "animal," the restoration of the aforesaid parts to their normal position being effected by gravity, a reservoir within the "animal" figure, and means for coöperating with said reservoir upon the raising of the "animal" body for ejecting the contents of the reservoir.

11. In a toy, a base, an "animal" figure mounted on the base and including rigid fore-legs, hind legs and a body pivoted to said fore-legs, a tail pivoted to the body, and means for first elevating the tail and then upon further movement move the body on its pivot to raise the rump of the "animal," the restoration of the aforesaid parts to their normal position being effected by gravity, a pivot on which said base is mounted, means for turning said base on its pivot during the movement of the "animal," a reservoir within the "animal" body, and means for coöperating with said reservoir upon the raising of the "animal" body for ejecting the contents of the reservoir.

12. In a toy, a base, an "animal" figure mounted on the base and including rigid fore-legs, hind legs and a body pivoted to said fore-legs, a tail pivoted to the body, and intermittently operating means for first elevating the tail and then upon further movement move the body on its pivot to raise the rump of the "animal," the restoration of the aforesaid parts to their normal position being effected by gravity, a pivot on which said base is mounted, means for turning said base on its pivot during the movements of the "animal," a reservoir within the "animal" figure, and means for coöperating with said reservoir upon the raising of the "animal" body for ejecting the contents of the reservoir.

13. In a toy, a base, an "animal" figure mounted on the base and including rigid fore-legs, hind legs and a body pivoted to said fore-legs, a tail pivoted to the body, and means for first elevating the tail and then upon further movement move the body on its pivot to raise the rump of the "animal," the restoration of the aforesaid parts to their normal position being effected by gravity, a human figure form mounted on said base and including arms hinged to the body of the form to operate in unison, a connection between one of said arms and the animal figure, a whip grasped by the hand of the other arm for engaging the "animal" body when said body is raised, a reservoir within the "animal" figure and means for coöperating with said reservoir upon the raising of the "animal" body for ejecting the contents of the reservoir.

14. In a toy, a base, an "animal" figure mounted on the base and including rigid fore-legs, hind legs and a body pivoted to said fore-legs, a tail pivoted to the body, and intermittently operating means for first elevating the tail and then upon further movement move the body on its pivot to raise the rump of the "animal," the restoration of the aforesaid parts to their normal position being effected by gravity, a human figure form mounted on said base and including arms hinged to the body of the form to operate in unison, a connection between one of said arms and the animal figure, a whip grasped by the hand of the other arm for engaging the "animal" body when said body is raised, a reservoir within the "animal" figure, and means for coöperating with said reservoir upon the raising of the "animal" body for ejecting the contents of the reservoir.

15. In a toy, a base, an "animal" figure mounted on the base and including rigid fore-legs, hind legs and a body pivoted to said fore-legs, a tail pivoted to the body, and means for first elevating the tail and then upon further movement move the body on its pivot to raise the rump of the "animal," the restoration of the aforesaid parts to their normal position being effected by gravity, a pivot on which said base is mounted, means for turning said base on its pivot during the movements of the "animal," a human figure form mounted on said base and including arms hinged to the body of the form to operate in unison, a connection between one of said arms and the animal figure, a whip grasped by the hand of the other arm for engaging the "animal" body when said body is raised, a reservoir within the "animal" figure, and means for coöperating with said reservoir upon the raising of the "animal" body for ejecting the contents of the reservoir.

16. In a toy, a base, an "animal" figure mounted on the base and including rigid fore-legs, hind legs and a body pivoted to said forelegs, a tail pivoted to the body, and intermittently operating means for first elevating the tail and then upon further movement move the body on its pivot to raise the rump of the "animal," the restoration of the aforesaid parts to their normal position being effected by gravity, a pivot on which said base is mounted, means for turning said base on its pivot during the movement of the "animal," a human figure form mounted on said base and including arms hinged to the body of the form to operate in unison, a connection between one of the arms and the animal figure, a whip grasped by the hand of the other arm for engaging the "animal" body when said body is raised, a reservoir within the "animal" figure and means for coöperating with said reservoir upon the raising of the "animal" body for ejecting the contents of the reservoir.

17. In a toy, a base, a pivot around which said base may be turned, a motor, and means driven thereby for turning said base on its pivot, a "horse" mounted on said base and including rigid forelegs and a body hinged to said fore-legs, said "horse" including a pivoted tail, a lever pivoted within the "horse" body and adapted to engage the back of the "horse" for turning the body on its pivot, a rod connected with said lever and projecting down through the base, a device connecting said rod with said motor to impart intermittent reciprocations to said rod to thereby actuate said lever, and a supplemental tail operating lever within the body, and pivotally connected to said first mentioned lever and connected to said tail whereby at the commencement of the operation of said rod the tail will be first elevated and upon further movement, the body of the "horse" will be turned on its pivot.

18. In a toy, a base, a pivot around which said base may be turned, a motor, and means driven thereby for turning said base on its pivot, a "horse" mounted on said base and including rigid fore-legs and a body hinged to said fore-legs, said "horse" including a pivoted tail, a lever pivoted within the "horse" body and adapted to engage the back of the "horse" for turning the body on its pivot, a rod connected with said lever and projecting down through the base, a device connecting said rod with said motor to impart intermittent reciprocations to said rod to thereby actuate said lever and a supplemental tail operating lever within the body and pivotally connected to said first mentioned lever and connected to said tail whereby at the commencement of the operation of said rod the tail will be first elevated and upon further movement, the body of the "horse" will be turned on its pivot, and a human figure form mounted on said base and including a pair of arms pivotally joined to the body of the human figure form, a connection between one of said arms and the head of the "horse," a whip held in the hand of the other arm for striking the "horse" when the body of the "horse" is turned on its pivot to raise the rump and lower the head.

19. In a toy, a base, a pivot pin and wheels supporting said base, a motor, connections between said motor and wheels for turning the base around the pivot pin as a center, an "animal" figure form mounted on the base and including mechanism for imparting antics to the figure, said mechanism including a reciprocating rod, said motor including a cam for actuating said rod, a brake lever pivoted beneath said base and including a weighted portion and a braking portion, said brake lever adapted to effect its braking act when said base is elevated off its support and to release said motor when said base is lowered onto a support.

20. A base, a motor mounted beneath said base, a "horse" mounted on said base, and an "attendant" also mounted on said base, said "attendant" including a body and arms pivoted to said body to move in unison, a connection between the hand of one of said arms and said "horse", a whip held in the other hand of the "attendant", said "horse" including a rigid support on which the body of said "horse" is pivoted, whereby the body of said "horse" is susceptible of being oscillated on the pivot, said "horse" including a tail pivoted to the body and having an actuating portion projecting into the body, said actuating portion being slotted, a tail operating lever provided within the body and projecting into the slot of said actuating portion, a main operating lever pivoted within the body and connected to said tail operating lever, an operating rod connected to said main operating lever and extending down through the base, connections between said rod for imparting intermittent reciprocations to the same, said main operating lever and said tail operating lever being so designed that upon the commencement of the movement of the operating rod in one direction, the tail will be first elevated and the body subsequently raised on its pivot.

21. A base, a motor mounted beneath said base, a "horse" mounted on said base, and an "attendant" also mounted on said base, said "attendant" including a body and arms pivoted to said body to move in unison, a connection between the hand of one of said arms and said "horse", a whip held in the other hand of the "attendant", said "horse" including a rigid support on which the body of said "horse" is pivoted, whereby the body of said "horse" is susceptible of being oscillated on the pivot, said "horse" including a tail pivoted to the body and having an actuating portion projecting into the body, said actuating portion being slotted, a tail operating lever provided within the body and projecting into the slot of said actuating portion, a main operating lever pivoted within the body and connected to said tail operating lever, an operating rod connected to said main operating lever and extending down through the base, connections between said rod for imparting intermittent reciprocations to the same, said main operating lever and said tail operating lever being so designed that upon the commencement of the movement of the operating rod in one direction, the tail will be first elevated and the body subsequently raised on its pivot, and shock absorbers on the rear feet of the "horse".

22. A base, a motor mounted beneath said base, a "horse" mounted on said base, and an "attendant" also mounted on said base, said "attendant" including a body and arms pivoted to said body to move in unison, a connection between the hand of one of said arms and said "horse", a whip held in the other hand of the "attendant", said "horse" including a rigid support on which the body of said "horse" is pivoted, whereby the body of said "horse" is susceptible of being oscillated on the pivot, said "horse" including a tail pivoted to the body and having an actuating portion projecting into the body, said actuating portion being slotted, a tail operating lever provided within the body and projecting into the slot of said actuating portion, a main operating lever pivoted within the body and connected to said tail operating lever, an operating rod connected to said main operating lever and extending down through the base, connections between said rod for imparting intermittent reciprocations to the same, said main operating lever and said tail operating lever being so designed that upon the commencement of the movement of the operating rod in one direction, the tail will be first elevated and the body subsequently raised on its pivot, a bulb reservoir within the body of the "horse", a squeezer relatively fixedly located within the body of the "horse" to engage said bulb and squeeze the same upon the movement of the body upon its pivot to eject the contents of the bulb.

DOMENICO RONCONI.

Witnesses:
CHAS. FIORNIER,
AURELIO PROSPERI.